US011581007B2

(12) United States Patent
Suto et al.

(10) Patent No.: US 11,581,007 B2
(45) Date of Patent: Feb. 14, 2023

(54) PREVENTING AUDIO DELAY-INDUCED MISCOMMUNICATION IN AUDIO/VIDEO CONFERENCES

(71) Applicant: Kyndryl, Inc., New York, NY (US)

(72) Inventors: Tiberiu Suto, Franklin, NY (US); Shikhar Kwatra, San Jose, CA (US); Hemant Kumar Sivaswamy, Pune (IN); Clement Decrop, Arlington, VA (US)

(73) Assignee: Kyndryl, Inc., New York, NY (US)

( * ) Notice: Subject to any disclaimer, the term of this patent is extended or adjusted under 35 U.S.C. 154(b) by 198 days.

(21) Appl. No.: 17/302,191

(22) Filed: Apr. 27, 2021

(65) Prior Publication Data
US 2022/0343938 A1    Oct. 27, 2022

(51) Int. Cl.
*G10L 21/10* (2013.01)
*H04N 7/15* (2006.01)
(Continued)

(52) U.S. Cl.
CPC .......... *G10L 21/10* (2013.01); *G06N 3/0454* (2013.01); *G10L 15/16* (2013.01);
(Continued)

(58) Field of Classification Search
CPC .. G06F 40/30; G06N 3/0454; G06Q 10/1091; G10L 13/00; G10L 15/16; G10L 15/1815;
(Continued)

(56) References Cited

U.S. PATENT DOCUMENTS 5,689,641 A * 11/1997 Ludwig ............... H04M 3/563
348/E7.083
8,209,181 B2   6/2012 Heckerman
(Continued)

FOREIGN PATENT DOCUMENTS

CN        110740283 A    1/2020
EP          1222657 B1    7/2002
(Continued)

OTHER PUBLICATIONS

Grand View Research, "Artificial Intelligence Market Size, Share & Trends Analysis Report by Solution (Hardware, Software, Services), by Technology (Deep Learning, Machine Learning), by End Use, by Region, And Segment Forecasts, 2020-2027," Jul. 2020, [accessed Jan. 11, 2021], Retrieved from the Internet: <https://www.grandviewresearch.com/industry-analysis/artificial-intelligence-ai-market>, 12 pages.

(Continued)

*Primary Examiner* — Gerald Gauthier
(74) *Attorney, Agent, or Firm* — Erik Swanson, Esq.; Kevin P. Radigan, Esq.; Heslin Rothenberg Farley & Mesiti P.C.

(57) ABSTRACT

Embodiments for delay-induced miscommunication reduction are provided. The embodiment may include capturing data streams transmitted between participants in an A/V exchange; translating, on a sender device prior to transmission to a recipient device, an audio stream within the data streams to text; timestamping, on a sender device prior to transmission to the recipient device, each word in the translated audio stream; transmitting the audio stream and the sender-side translated and timestamped audio stream to the recipient device; translating, on the recipient device, the transmitted audio stream to text; timestamping, on the recipient device, each word in the translated audio stream; determining a lag exists in the A/V exchange based on a (Continued)

comparison of each timestamp for corresponding words on the sender-side translated and timestamped audio stream and the recipient-side translated and timestamped audio stream; and generating a true transcript of an intended exchange between the participants based on the comparison.

20 Claims, 5 Drawing Sheets

(51) Int. Cl.
| | |
|---|---|
| *H04L 7/00* | (2006.01) |
| *G06N 3/04* | (2023.01) |
| *G10L 15/22* | (2006.01) |
| *G10L 15/30* | (2013.01) |
| *G10L 15/16* | (2006.01) |
| *G10L 15/18* | (2013.01) |

(52) U.S. Cl.
CPC .......... *G10L 15/1815* (2013.01); *G10L 15/22* (2013.01); *G10L 15/30* (2013.01); *H04L 7/0008* (2013.01); *H04N 7/15* (2013.01)

(58) Field of Classification Search
CPC ......... G10L 15/22; G10L 15/26; G10L 15/30; G10L 21/10; H04L 7/0008; H04L 12/1827; H04L 51/04; H04L 65/1053; H04L 65/1105; H04L 65/403; H04L 65/70; H04L 65/762; H04L 65/80; H04M 1/2475; H04M 3/563; H04M 9/08; H04N 5/05; H04N 7/147; H04N 7/15; H04N 21/234336; H04N 21/4131; H04N 21/4305; H04N 21/6137
See application file for complete search history.

(56) References Cited

U.S. PATENT DOCUMENTS

| | | | |
|---|---|---|---|
| 8,407,049 B2 | 3/2013 | Cromack | |
| 8,582,565 B1* | 11/2013 | Morsy | H04N 21/6137 |
| | | | 370/252 |
| 8,649,494 B2 | 2/2014 | Basson | |
| 8,874,429 B1* | 10/2014 | Crosley | H04N 5/05 |
| | | | 348/14.08 |
| 10,067,937 B2 | 9/2018 | Crosley | |
| 10,382,657 B2 | 8/2019 | Meek | |
| 2002/0112004 A1* | 8/2002 | Reid | H04L 65/1101 |
| | | | 715/753 |
| 2002/0161579 A1* | 10/2002 | Saindon | G10L 15/26 |
| | | | 704/235 |
| 2006/0053455 A1* | 3/2006 | Mani | H04N 21/4305 |
| | | | 375/E7.278 |
| 2008/0295040 A1* | 11/2008 | Crinon | H04L 51/04 |
| | | | 709/204 |
| 2011/0276326 A1* | 11/2011 | Fumarolo | G10L 15/26 |
| | | | 704/235 |
| 2013/0147903 A1* | 6/2013 | Weiser | H04L 65/1053 |
| | | | 348/E7.083 |
| 2015/0106091 A1* | 4/2015 | Wetjen | G10L 15/26 |
| | | | 704/235 |
| 2018/0183851 A1* | 6/2018 | Fiedler | H04L 65/80 |
| 2020/0007671 A1* | 1/2020 | Engelke | H04M 1/2475 |
| 2020/0135224 A1* | 4/2020 | Bromand | H04M 9/08 |
| 2020/0314460 A1 | 10/2020 | Hu | |
| 2020/0349953 A1* | 11/2020 | Qin | G10L 15/26 |
| 2021/0144422 A1* | 5/2021 | Wagner | H04N 21/4131 |
| 2021/0160242 A1* | 5/2021 | McKnight | G06Q 10/1091 |
| 2021/0183394 A1* | 6/2021 | Holmes | G10L 15/26 |
| 2021/0357597 A1* | 11/2021 | Cholas | H04N 21/234336 |
| 2022/0141331 A1* | 5/2022 | He | H04L 12/1827 |
| | | | 704/200 |
| 2022/0253268 A1* | 8/2022 | Deole | H04N 7/15 |
| 2022/0343938 A1* | 10/2022 | Suto | G10L 15/30 |

FOREIGN PATENT DOCUMENTS

| | | |
|---|---|---|
| JP | 2011507342 A | 3/2011 |
| KR | 20120137436 A | 12/2012 |

OTHER PUBLICATIONS

Grand View Research, "Team Collaboration Software Market Size, Share & Trends Analysis Report by Application, by Software Type (Conferencing, Communication & Coordination), by Deployment (Cloud, On-premise), and Segment Forecasts, 2020-2027," May 2020, [accessed Jan. 11, 2021], Retrieved from the Internet: <https://www.grandviewresearch.com/industry-analysis/team-collaboration-software-market>, 11 pages.

Youtube, "Avenue 5: What is They Saying? (Season 1 Episode 2 Clip) | HBO," Jan. 26, 2020, [accessed Jan. 8, 2021], Retrieved from the Internet: <https://www.youtube.com/watch?v=X8ataCPyiik>, 3 pages.

Mell et al., "The NIST Definition of Cloud Computing", National Institute of Standards and Technology, Special Publication 800-145, Sep. 2011, 7 pages.

* cited by examiner

PREVENTING AUDIO DELAY-INDUCED MISCOMMUNICATION IN AUDIO/VIDEO CONFERENCES

BACKGROUND

The present invention relates generally to the field of computing, and more particularly to audio/video conferencing.

Audio/video (A/V) conferencing, or web conferencing, may relate to any communication between two or individuals over a network, such as the Internet, where the participating member utilize audio and/or video streams. Web conferencing allows for a dynamic interface between users in separate locations to efficiently communicate as if they were in person by allowing face-to-face interactions and the sharing of files between participating users. Popular web conferencing applications include Zoom® (Zoom and all Zoom-based trademarks and logos are trademarks or registered trademarks of Zoom Video Communications Inc. and/or its affiliates), Webex® (Webex and all Webex-based trademarks and logos are trademarks or registered trademarks of Webex Communications, Inc. and/or its affiliates), GoToMeeting® (GoToMeeting and all GoToMeeting-based trademarks and logos are trademarks or registered trademarks of Citrix Online, LLC. and/or its affiliates), and FaceTime® (Facetime and all Facetime-based trademarks and logos are trademarks or registered trademarks of Apple Inc. and/or its affiliates) among others.

SUMMARY

According to one embodiment, a method, computer system, and computer program product for delay-induced miscommunication reduction is provided. The embodiment may include capturing one or more data streams transmitted between participants in an audio/video (A/V) exchange. The embodiment may also include translating, on a sender device prior to transmission to a recipient device, an audio stream within the one or more data streams to text. The embodiment may further include timestamping, on a sender device prior to transmission to the recipient device, each word in the translated audio stream. The embodiment may also include transmitting the audio stream and the sender-side translated and timestamped audio stream to the recipient device. The embodiment may further include translating, on the recipient device, the transmitted audio stream to text. The embodiment may also include timestamping, on the recipient device, each word in the translated audio stream. The embodiment may further include determining a lag exists in the A/V exchange based on a comparison of each timestamp for corresponding words on the sender-side translated and timestamped audio stream and the recipient-side translated and timestamped audio stream. The embodiment may also include generating a true transcript of an intended exchange between the participants based on the comparison.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
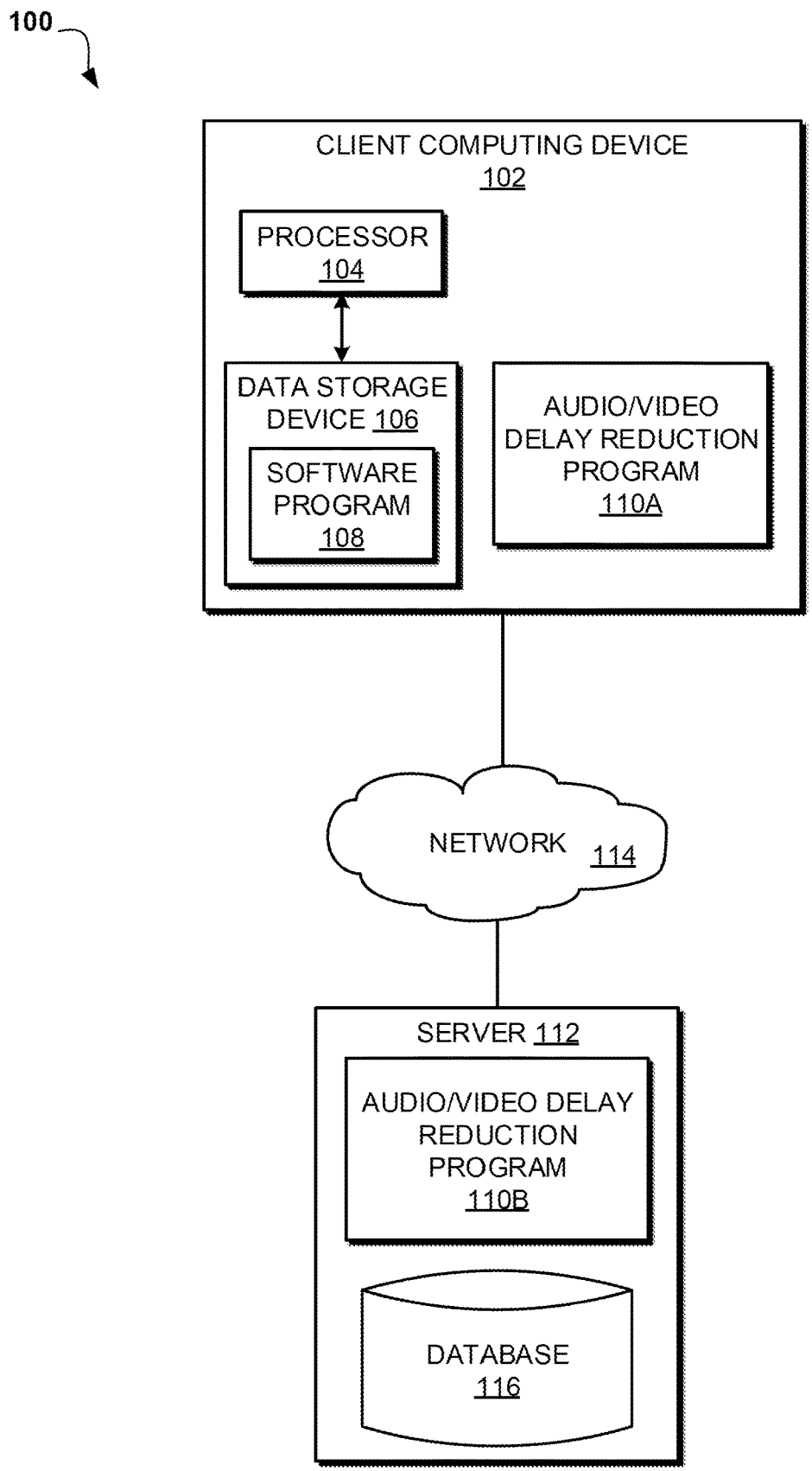
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to audio/video conferencing. The following described exemplary embodiments provide a system, method, and program product to, among other things, generating a transcript of a web conference dialog that accounts for audio/video (A/V) delays that may have resulted in a miscommunication between meeting participants. Therefore, the present embodiment has the capacity to improve the technical field of web conferencing by reducing miscommunications resulting from an A/V while participating in a web conference.

As previously described, A/V conferencing, or web conferencing, may relate to any communication between two or individuals over a network, such as the Internet, where the participating member utilize audio and/or video streams. Web conferencing allows for a dynamic interface between users in separate locations to efficiently communicate as if they were in person by allowing face-to-face interactions and the sharing of files between participating users. Popular web conferencing applications include Zoom®, Webex®, GoToMeeting®, and FaceTime® among others.

Computing has radically transformed the way people communicate, improving both speed and quality of information exchange. In particular, computing enables authentication restrictions, accurate language translation, and personalization in ways that paper communications cannot. However, paper communications remain both prevalent and necessary as direct mail advertising continues to bring in significant revenue for many businesses and many official government communications are transmitted through physical mail.

Frequently, when web conference participants converse during a conference collaboration, a lag due to limited network bandwidth or variable capacity may result in the receiving participant(s) hearing responses in a delayed fashion, which can often lead to miscommunication within the dialog exchange. As such, it may be advantageous to, among other things, provide a seamless system of A/V engagement in order to avoid any interruption in a web conference exchange to enhance the duplex communication experience.

According to at least one embodiment, delay-induced miscommunications in audio or video conferences may be reduced through adoption of topic linking and analysis in real-time synchronization form. Each node of communication in a web conference may establish a high-resolution clock timestamp for capturing and timestamping audio and video. The timestamped A/V data from each participant node may be translated using speech-to-text technology and compared to determine a total amount of delay present. A true, real-time transcript of the conversation may be generated and displayed on a graphical user interface thereby avoid potential misaligned communications invoked by any delay present. In at least one embodiment, an audio reproduction of the web conference may be created from the generated transcript that properly aligns the communications according to participant intents should the delay not be present.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to reduce delay-induced miscommunications in web conferences through the implementation of topic linking and real-time synchronization.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and a miscommunication reduction program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As previously described, one client computing device 102 is depicted in FIG. 1 for illustrative purposes. However, any number of client computing devices 102 may be utilized in a web conferencing session by individual users or groups of users. As will be discussed with reference to FIG. 3, the client computing device 102 may include internal components 302a and external components 304a, respectively.

The server computer 112 may be a laptop computer, netbook computer, personal computer (PC), a desktop computer, or any programmable electronic device or any network of programmable electronic devices capable of hosting and running a miscommunication reduction program 110B and a database 116 and communicating with the client computing device 102 via the communication network 114, in accordance with embodiments of the invention. As will be discussed with reference to FIG. 3, the server computer 112 may include internal components 302b and external components 304b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the miscommunication reduction program 110A, 110B may be capable of establishing a high-resolution clock timestamp at each node participating in an A/V conference synchronized to either an atomic clock or a common Network Time Protocol (NTP). As each participant to the A/V conference speaks, the miscommunication reduction program 110A, 110B may be translate the spoken audio using speech-to-text technology and add timestamps to each word spoken. The miscommunication reduction program 110A, 110B may then compare the timestamped, translated audio for each participating node and generate a transcript based on the timestamps that is temporally categorized in order to generate a conversation that conforms to each participant's intent. The miscommunication reduction method is explained in further detail below with respect to FIG. 2.

Figure 2:
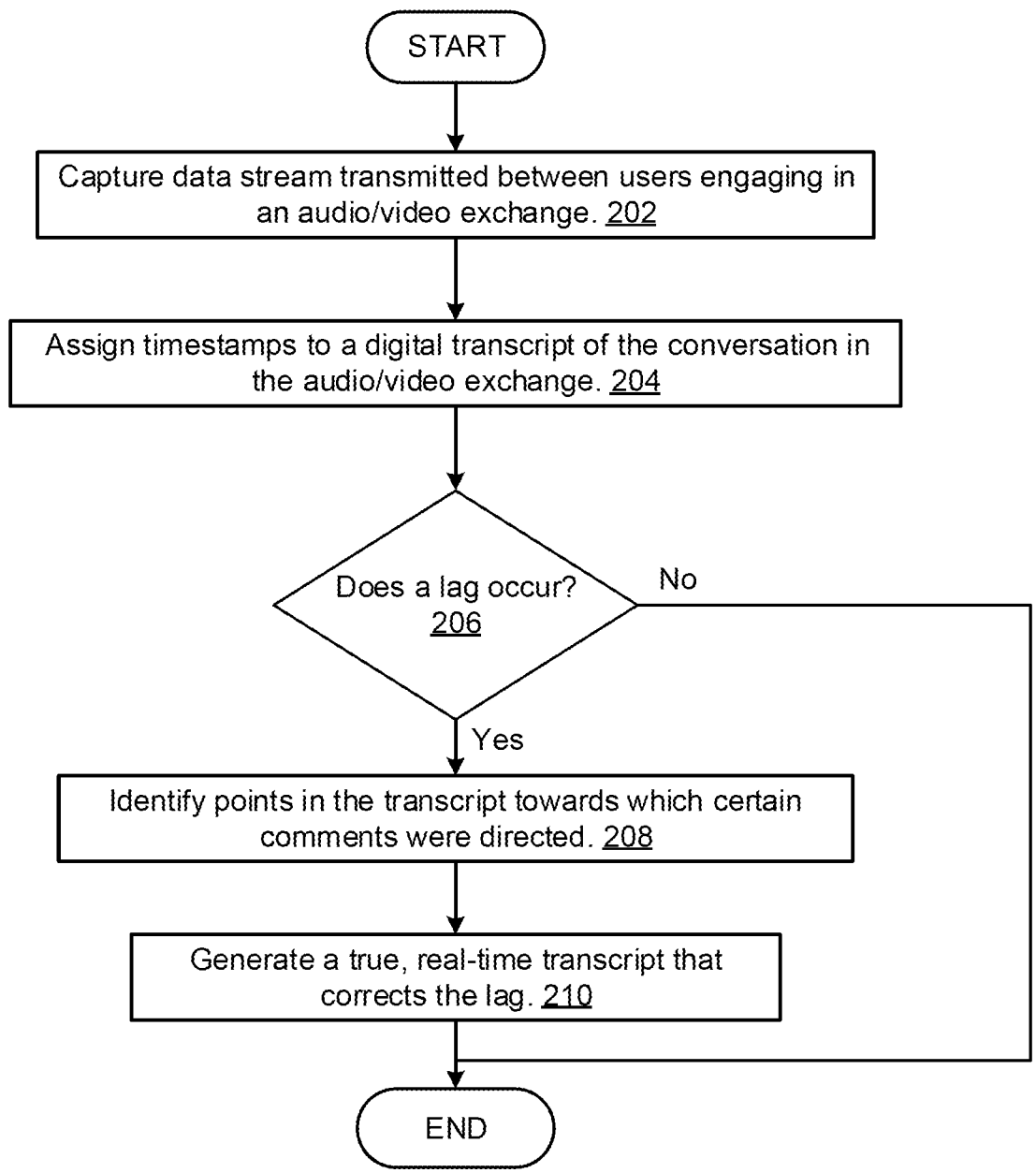
FIG. 2 illustrates an operational flowchart for an audio/video (A/V) delay reduction process according to at least one embodiment.

Referring now to FIG. 2, an operational flowchart illustrating a miscommunication reduction process 200 is depicted according to at least one embodiment. At 202, the miscommunication reduction program 110A, 110B captures data streams transmitted between users engaging in an A/V exchange. Upon the commencement of a web conference between two or more users using a web conferencing program, such as Webex®, Zoom®, GoToMeeting®, and FaceTime®, the miscommunication reduction program 110A, 110B may capture data streams of audio and video data transferred between each user participating in the web conference. For example, if User A and User B begin a virtual meeting using a web conferencing software, such as software program 108, the miscommunication reduction program 110A, 110B may begin capturing any data streams transmitted from the user devices associated with both User A and User B upon commencement of the virtual meeting. In at least one embodiment, the data streams are transmitted across the network 114 to server 112 where the miscommunication reduction program 110A, 110B may be hosted and capable of capturing the data streams. In at least one embodiment, the miscommunication reduction program 110A, 110B may require each user to opt-in to enable the capture of the data streams. In at least one other embodiment, the opt-in may be acknowledged through user installation of the miscommunication reduction program 110A, 110B.

The data stream captured by the miscommunication reduction program 110A, 110B may include any data stream currently being transmitted by a user to any or all other users participating in the web conference. For example, if a user is sharing only an audio stream with the other user and opting out of sharing a camera video stream, the miscommunication reduction program 110A, 110B may only capture the shared audio stream. However, should the user initiate a screen sharing session, the miscommunication reduction program 110A, 110B may begin capturing a video stream of the screen capture until such feature, or the web conferencing session as a whole, is terminated. As another example, the miscommunication reduction program 110A, 110B may also capture text streams that a user transmits to either a group chat window or a private chat window. Should text streams be transmitted to a private chat window, only user participating in the private chat to which the text was transmitted may be capable of seeing the chat messages in the real-time transcript generated in step 210.

Then, at 204, the miscommunication reduction program 110A, 110B assigns timestamps to a digital transcript of the conversation in the A/V exchange. An exact time delay may be difficult to determine from the moment spoken by one party until it is heard by remote participants on the web conference. Compounding to this delay is any further delay introduced while a secondary speaker replies before the original speaker's transmission is fully heard by each participant. However, time synchronization between user devices to a common high-resolution source and use of a high-resolution signal and speech-to-text conversion at both transmission and reception nodes may identify the exact offset at each remote device. Therefore, each user node participating in a web conference may establish a high-resolution clock timestamp by synchronizing to either an atomic clock or a common NTP. A speech-to-text module may translate and add timestamps to each spoken word in real-time on the local device corresponding to the speaking user and, upon the audio stream being received on another node in the web conference, translating and timestamping on a remote device of a receiving user. The translated text, along with the timestamp for each word, may be transmitted to each node in the web conference asynchronously through a different protocol or port as the main audio and/or video data streams. In at least one embodiment, retransmissions may occur for some dialog portions in order to prevent any missed packets from affecting reception at the remote nodes (i.e., the receiving nodes in the web conference).

As a remote node in the web conference receives and hears the audio stream from the originating node, the miscommunication reduction program 110A, 110B may translate the received audio stream as heard by the remote node to text using speech-to-text and, thereby, timestamping each spoken word as was similarly performed at the originating node. A comparison of the translated and timestamped stream from the originating node against the translated and timestamped stream from the receiving node may result in a determination that a sufficient lag exists that may result in communication delays adequate enough for potential miscommunication during the web conference.

For example, when User A asks a question at the 5:00 minute mark of a video web conference with User B, the miscommunication reduction program 110A, 110B may translate the spoken audio from User A to text using speech-to-text and timestamp each word translated on the local device User A is utilizing for the conference. Therefore, three data streams (i.e., a video stream of User A, an original audio stream of User A speaking, and a timestamped textual stream of the original audio of User A speaking) may be transmitted to User B. The three data streams may thereafter be received by User B's device. The miscommunication reduction program 110A, 110B on User B's device may perform real-time translation and timestamping of the original audio stream of User A speaking upon its reception for further comparison to the timestamped textual stream of User A's original audio.

Next, at 206, the miscommunication reduction program 110A, 110B determines whether a lag occurs in the A/V exchange. The miscommunication reduction program 110A, 110B may determine that a lag occurs through a comparison of the timestamps associated with a specific word or words on the transcript generated prior to transmission against the timestamp associated with the same word or words on the transcript generated after reception. A lag may be determined to occur when the difference in the timestamps satisfies a preconfigured lag threshold value. For example, continuing the previous example, the miscommunication reduction program 110A, 110B may determine a lag exists if a comparison of the timestamps for the same words in the translated stream as timestamped on User A's device before transmission and User B's device after transmission satisfy a preconfigured threshold. If the miscommunication reduction program 110A, 110B determines lag occurs in the A/V exchange (step 206, "Yes" branch), then the miscommunication reduction process 200 may proceed to step 208 to identify points in the transcript towards which certain comments were directed. If the miscommunication reduction program 110A, 110B determines no lag occurs in the A/V exchange (step 206, "No" branch), then the miscommunication reduction process 200 may terminate. In at least one embodiment, the miscommunication reduction program 110A, 110B may determine a lag exists dynamically based on word boundaries. For example, if the lag exceeds a particular most recent word duration, which may itself be determined by examining the difference in timestamps between the start of the most recent word and the start of the next word, then the miscommunication reduction program 110A, 110B may consider the lag significant enough (i.e., exceeding the threshold) to warrant corrective steps (i.e., continuing down the "Yes" branch).

Then, at 208, the miscommunication reduction program 110A, 110B identifies one or more points in the transcript towards which certain comments were directed. Based on the comparison, the miscommunication reduction program 110A, 110B may identify, in real-time, certain points within the A/V exchange where sufficient delay in the transmission between participants results in a miscommunication. The miscommunication reduction program 110A, 110B may then determine, through natural language processing, an intended order of the communications. For example, in a web conference between User A and User B, User A may states an interest for item A for five to ten seconds, pause for one to two seconds, then proceeds to state a dislike for item B. Upon hearing User A's interest in item A, User B responds "I feel the same way". However, due to a significant delay in transmission, User A only hears User B's statement upon completion of User A's statement of dislike for item B and believe User B also dislikes item B. The miscommunication reduction program 110A, 110B may identify this exchange as a point in the transcript where a miscommunication may have resulted from the determined lag based on the timestamps of each word or words.

Next, at 210, the miscommunication reduction program 110A, 110B generates a true, real-time transcript that corrects the lag. Upon identifying the one or more points, the miscommunication reduction program 110A, 110B may generate a true, real-time transcript that reorganizes the word or words associated with the one or more points so that the transcript conveys the meaning intended by the exchange participants absent the determined lag. For example, in the previously described situation between User A and User B, the miscommunication reduction program 110A, 110B may determine that User B intended the statement of "I feel the same way" to be heard by User A after User A stated an interest in item A. Therefore, the miscommunication reduction program 110A, 110B may generate a transcript in a graphical user interface of the web conferencing application (e.g., software program 108) that orders the exchange as User A's statement of interest in item A, User B's agreement with an interest in item A, and then User B's statement of a disinterest in item B thereby correcting any miscommunication perceived by participants as a result of the lag.

In at least one embodiment, the miscommunication reduction program 110A, 110B the true, real-time transcript may be a reorganization of a recordation of the audio exchange between the participants so that the recording provides properly aligned audio according to each participant's timestamps in a seamless manner that removes any affect resulting from delays or lag. In order to produce an accurate audio recordation, the miscommunication reduction program 110A, 110B may utilize a generated adversarial network (GAN) to fill in any delay gaps in the audio. A corpus may be generated by logging the audio of a specific user whenever the user is utilizing a tool, such as software program 108, that opts into the miscommunication reduction program 110A, 110B. Textual synthesis may be performed and fed into a generative pre-trained transformer with previous information and contextual arrangement. Furthermore, a discriminator network may evaluate the difference, via a comparator architecture, any deviation in the synthesized information from the baseline information.

In at least one other embodiment, the miscommunication reduction program 110A, 110B may generate a transcript even if no lag is determined to be present.

It may be appreciated that FIG. 2 provides only an illustration of one implementation and does not imply any limitations with regard to how different embodiments may be implemented. Many modifications to the depicted environments may be made based on design and implementation requirements.

Figure 3:
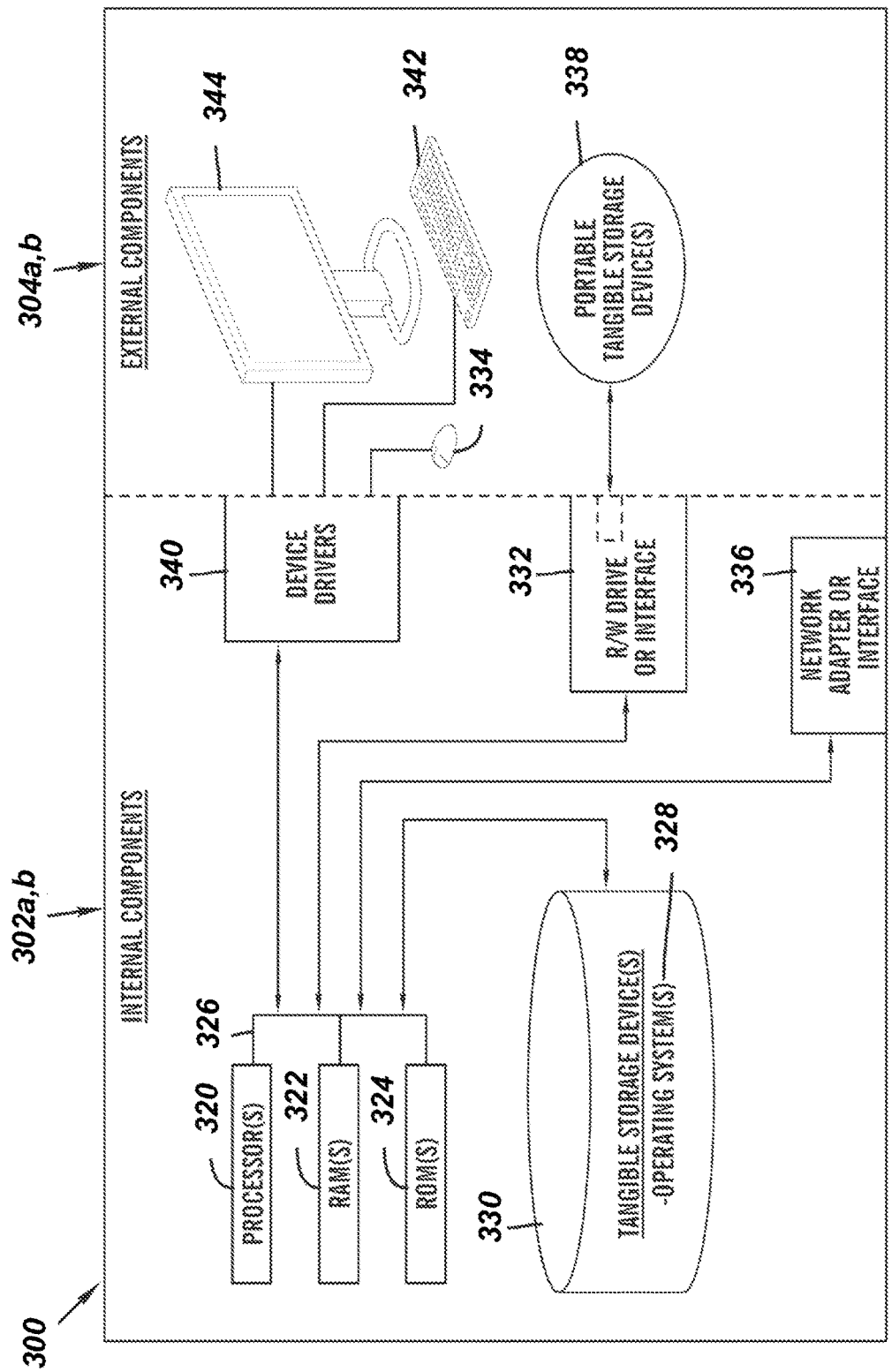
FIG. 3 is a block diagram of internal and external components of computers and servers depicted in FIG. 1 according to at least one embodiment.

FIG. 3 is a block diagram 300 of internal and external components of the client computing device 102 and the server 112 depicted in FIG. 1 in accordance with an embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

The data processing system 302, 304 is representative of any electronic device capable of executing machine-readable program instructions. The data processing system 302, 304 may be representative of a smart phone, a computer system, PDA, or other electronic devices. Examples of computing systems, environments, and/or configurations that may be represented by the data processing system 302, 304 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 302a,b and external components 304a,b illustrated in FIG. 3. Each of the sets of internal components 302 include one or more processors 320, one or more computer-readable RAMs 322, and one or more computer-readable ROMs 324 on one or more buses 326, and one or more operating systems 328 and one or more computer-readable tangible storage devices 330. The one or more operating systems 328, the software program 108 and the miscommunication reduction program 110A in the client computing device 102 and the miscommunication reduction program 110B in the server 112 are stored on one or more of the respective computer-readable tangible storage devices 330 for execution by one or more of the respective processors 320 via one or more of the respective RAMs 322 (which typically include cache memory). In the embodiment illustrated in FIG. 3, each of the computer-readable tangible storage devices 330 is a magnetic disk storage device of an internal hard drive. Alternatively, each of the computer-readable tangible storage devices 330 is a semiconductor storage device such as ROM 324, EPROM, flash memory or any other computer-readable tangible storage device that can store a computer program and digital information.

Each set of internal components 302a,b also includes a R/W drive or interface 332 to read from and write to one or more portable computer-readable tangible storage devices 338 such as a CD-ROM, DVD, memory stick, magnetic tape, magnetic disk, optical disk or semiconductor storage device. A software program, such as the miscommunication reduction program 110A, 110B, can be stored on one or more of the respective portable computer-readable tangible storage devices 338, read via the respective R/W drive or interface 332, and loaded into the respective hard drive 330.

Each set of internal components 302a,b also includes network adapters or interfaces 336 such as a TCP/IP adapter cards, wireless Wi-Fi interface cards, or 3G or 4G wireless interface cards or other wired or wireless communication links. The software program 108 and the cognitive braille adjustment program 110A in the client computing device 102 and the miscommunication reduction program 110B in the server 112 can be downloaded to the client computing device 102 and the server 112 from an external computer via a network (for example, the Internet, a local area network or other, wide area network) and respective network adapters or interfaces 336. From the network adapters or interfaces 336, the software program 108 and the miscommunication reduction program 110A in the client computing device 102 and the miscommunication reduction program 110B in the server 112 are loaded into the respective hard drive 330. The network may comprise copper wires, optical fibers, wireless transmission, routers, firewalls, switches, gateway computers and/or edge servers.

Each of the sets of external components 304a,b can include a computer display monitor 344, a keyboard 342, and a computer mouse 334. External components 304a,b can also include touch screens, virtual keyboards, touch pads, pointing devices, and other human interface devices. Each of the sets of internal components 302a,b also includes device drivers 340 to interface to computer display monitor 344, keyboard 342, and computer mouse 334. The device drivers 340, R/W drive or interface 332, and network adapter or interface 336 comprise hardware and software (stored in storage device 330 and/or ROM 324).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
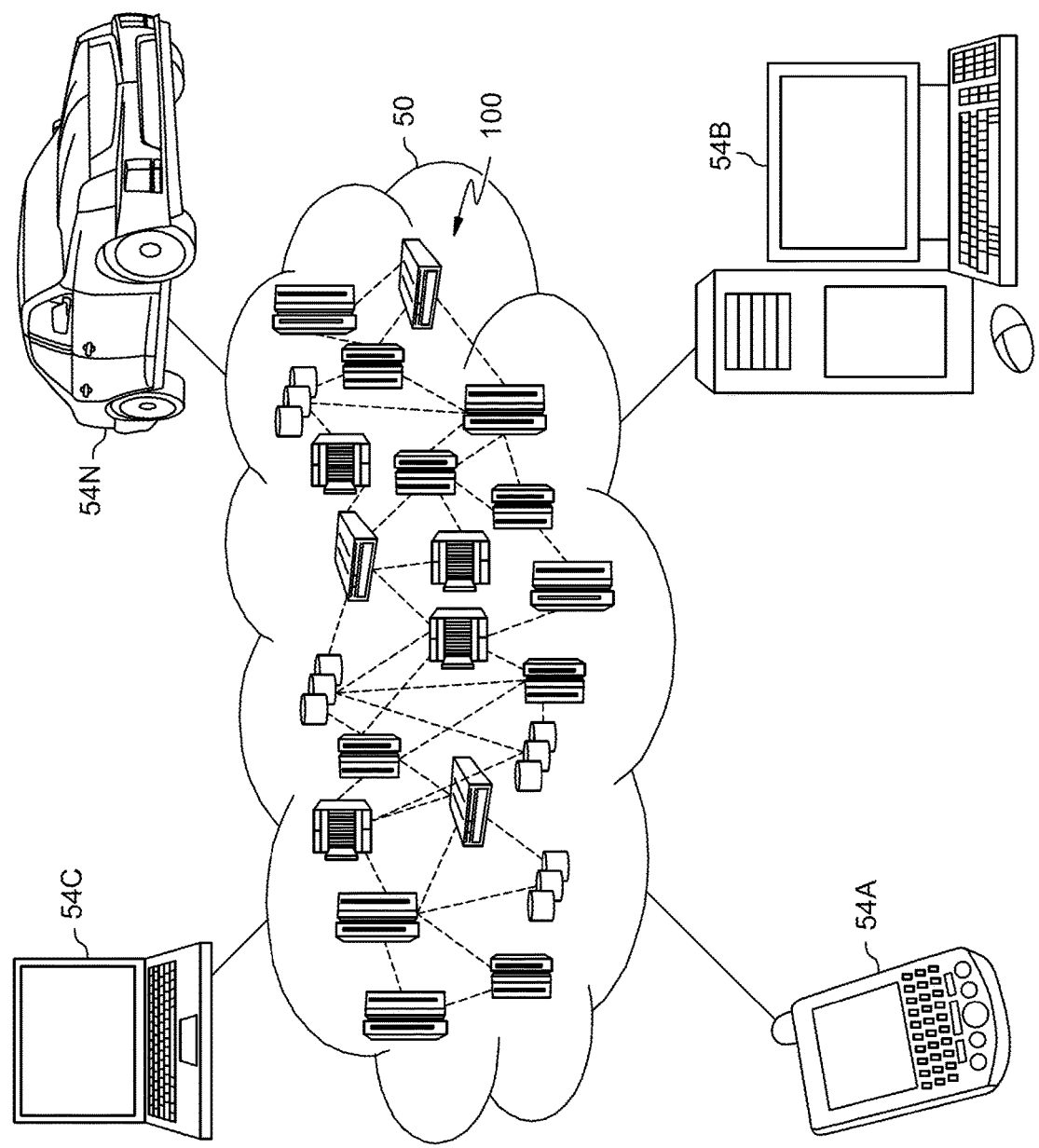
FIG. 4 depicts a cloud computing environment according to an embodiment of the present invention.

Referring now to FIG. 4, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 100 and cloud computing environment 50 can communicate with any type of computerized device over any type of network and/or network addressable connection (e.g., using a web browser).

Figure 5:
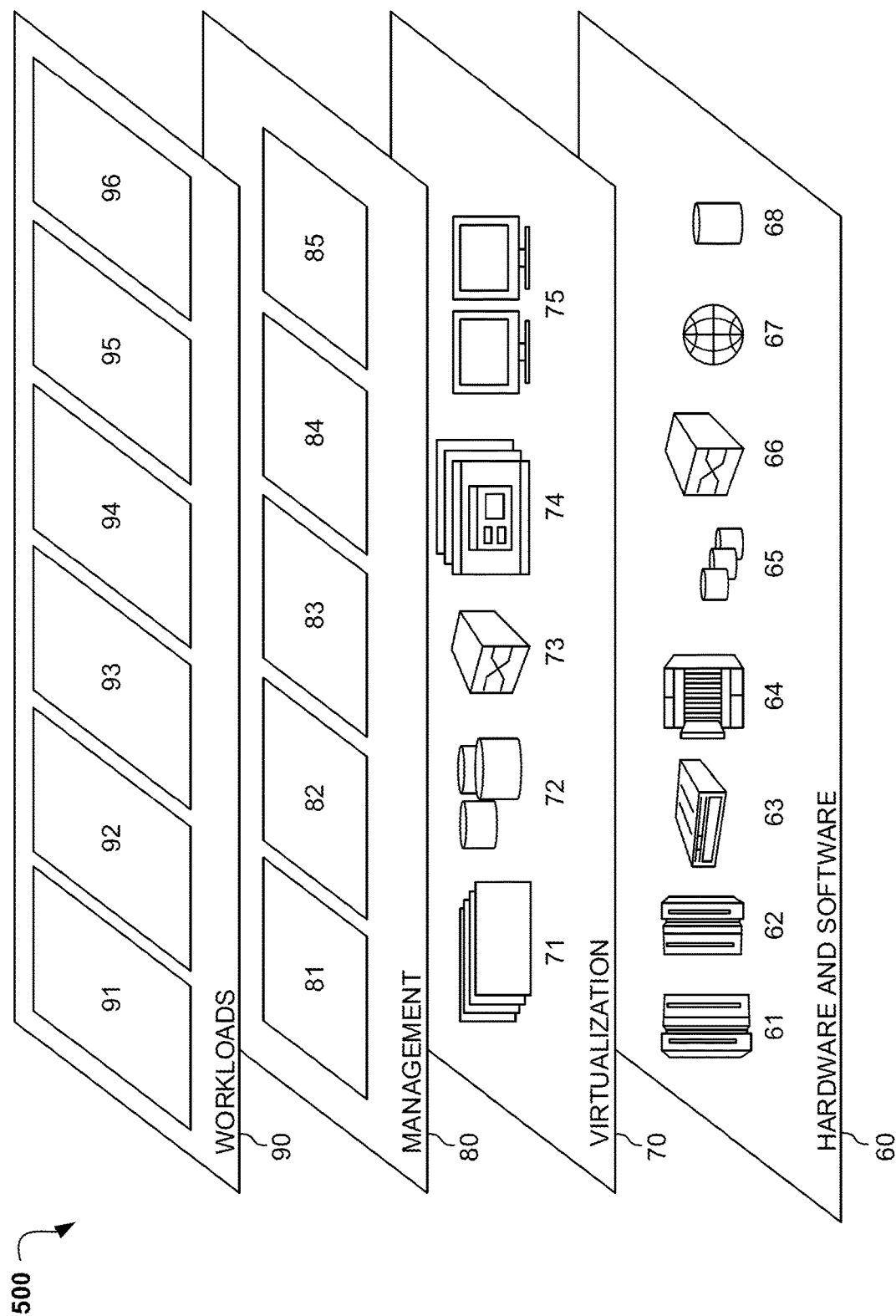
FIG. 5 depicts abstraction model layers according to an embodiment of the present invention.

Referring now to FIG. 5, a set of functional abstraction layers 500 provided by cloud computing environment 50 is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and miscommunication reduction 96. Miscommunication reduction 96 may relate determining lag is present in an A/V exchange between two or more participants, identifying points at which a miscommunication may have resulted from the lag, and generating a true transcript of the exchange that corrects any possible misunderstanding based on timestamps of specific words or phrases.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method, the method comprising:
   capturing one or more data streams transmitted between participants in an audio/video (A/V) exchange;
   translating, on a sender device prior to transmission to a recipient device, an audio stream within the one or more data streams to text;
   timestamping, on a sender device prior to transmission to the recipient device, each word in the translated audio stream;
   transmitting the audio stream and the sender-side translated and timestamped audio stream to the recipient device;
   translating, on the recipient device, the transmitted audio stream to text;
   timestamping, on the recipient device, each word in the translated audio stream;
   determining a lag exists in the A/V exchange based on a comparison of each timestamp for corresponding words on the sender-side translated and timestamped audio stream and the recipient-side translated and timestamped audio stream; and
   generating a true transcript of an intended exchange between the participants based on the comparison.

2. The method of claim 1, further comprising:
   identifying one or more points in the translated audio stream where the determined lag satisfies a preconfigured lag threshold; and
   determining an intended order of communication for the one or more identified points based on natural language processing and the comparison.

3. The method of claim 1, wherein generation of the true transcript is performed in real-time and reorganizes words or phrases based on the determined lag in the comparison to align with a speaker intention.

4. The method of claim 1, further comprising:
   displaying the generated true transcript, in real-time, on a graphical user interface associated with a software program enabling the A/V exchange.

5. The method of claim 1, wherein generated true transcript is an audio reproduction of the audio stream.

6. The method of claim 5, wherein the audio reproduction is generated using a Generated Adversarial Network (GAN) to fill any delay gaps in the audio stream.

7. The method of claim 1, wherein the sender device and the recipient device perform time synchronization using a common high-resolution source and a high-resolution signal, wherein the common high-resolution source is selected from a group consisting of an atomic clock or a common Network Time Protocol (NTP).

8. A computer system, the computer system comprising:
   one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
   capturing one or more data streams transmitted between participants in an audio/video (A/V) exchange;
   translating, on a sender device prior to transmission to a recipient device, an audio stream within the one or more data streams to text;
   timestamping, on a sender device prior to transmission to the recipient device, each word in the translated audio stream;
   transmitting the audio stream and the sender-side translated and timestamped audio stream to the recipient device;
   translating, on the recipient device, the transmitted audio stream to text;
   timestamping, on the recipient device, each word in the translated audio stream;
   determining a lag exists in the A/V exchange based on a comparison of each timestamp for corresponding words on the sender-side translated and timestamped audio stream and the recipient-side translated and timestamped audio stream; and
   generating a true transcript of an intended exchange between the participants based on the comparison.

9. The computer system of claim 8, further comprising:
   identifying one or more points in the translated audio stream where the determined lag satisfies a preconfigured lag threshold; and
   determining an intended order of communication for the one or more identified points based on natural language processing and the comparison.

10. The computer system of claim 8, wherein generation of the true transcript is performed in real-time and reorganizes words or phrases based on the determined lag in the comparison to align with a speaker intention.

11. The computer system of claim 8, further comprising:
    displaying the generated true transcript, in real-time, on a graphical user interface associated with a software program enabling the A/V exchange.

12. The computer system of claim 8, wherein generated true transcript is an audio reproduction of the audio stream.

13. The computer system of claim 12, wherein the audio reproduction is generated using a Generated Adversarial Network (GAN) to fill any delay gaps in the audio stream.

14. The computer system of claim 8, wherein the sender device and the recipient device perform time synchronization using a common high-resolution source and a high-resolution signal, wherein the common high-resolution source is selected from a group consisting of an atomic clock or a common Network Time Protocol (NTP).

15. A computer program product, the computer program product comprising:
   one or more computer-readable tangible storage medium and program instructions stored on at least one of the one or more tangible storage medium, the program instructions executable by a processor capable of performing a method, the method comprising:
   capturing one or more data streams transmitted between participants in an audio/video (A/V) exchange;
   translating, on a sender device prior to transmission to a recipient device, an audio stream within the one or more data streams to text;
   timestamping, on a sender device prior to transmission to the recipient device, each word in the translated audio stream;
   transmitting the audio stream and the sender-side translated and timestamped audio stream to the recipient device;
   translating, on the recipient device, the transmitted audio stream to text;
   timestamping, on the recipient device, each word in the translated audio stream;
   determining a lag exists in the A/V exchange based on a comparison of each timestamp for corresponding words on the sender-side translated and timestamped audio stream and the recipient-side translated and timestamped audio stream; and
   generating a true transcript of an intended exchange between the participants based on the comparison.

16. The computer program product of claim 15, further comprising:
   identifying one or more points in the translated audio stream where the determined lag satisfies a preconfigured lag threshold; and
   determining an intended order of communication for the one or more identified points based on natural language processing and the comparison.

17. The computer program product of claim 15, wherein generation of the true transcript is performed in real-time and reorganizes words or phrases based on the determined lag in the comparison to align with a speaker intention.

18. The computer program product of claim 15, further comprising:
   displaying the generated true transcript, in real-time, on a graphical user interface associated with a software program enabling the A/V exchange.

19. The computer program product of claim 15, wherein generated true transcript is an audio reproduction of the audio stream.

20. The computer program product of claim 19, wherein the audio reproduction is generated using a Generated Adversarial Network (GAN) to fill any delay gaps in the audio stream.

* * * * *